(12) United States Patent
Thorsen et al.

(10) Patent No.: US 8,950,759 B2
(45) Date of Patent: Feb. 10, 2015

(54) SYSTEMS AND METHODS FOR STEERING VEHICLES (71) Applicants: Jason Thorsen, Greenville, NC (US); Roger J. Baywol, Grand Blanc, MI (US); Edward J. Mowczan, China Township, MI (US)

(72) Inventors: Jason Thorsen, Greenville, NC (US); Roger J. Baywol, Grand Blanc, MI (US); Edward J. Mowczan, China Township, MI (US)

(73) Assignee: NACCO Materials Handling Group, Inc., Fairview, OR (US)

( * ) Notice: Subject to any disclaimer, the term of this patent is extended or adjusted under 35 U.S.C. 154(b) by 0 days.

(21) Appl. No.: 13/842,182

(22) Filed: Mar. 15, 2013

(65) Prior Publication Data
US 2013/0277929 A1 Oct. 24, 2013

Related U.S. Application Data (60) Provisional application No. 61/612,519, filed on Mar. 19, 2012.

(51) Int. Cl.
B62D 33/10 (2006.01)
B62B 3/02 (2006.01)
B62B 3/00 (2006.01)
B62B 3/06 (2006.01)

(52) U.S. Cl.
CPC . B62B 3/02 (2013.01); B62B 3/001 (2013.01); B62B 3/008 (2013.01); B62B 3/06 (2013.01); B62B 2301/00 (2013.01); B62B 2203/20 (2013.01)
USPC ..................................... 280/43.12; 280/43.13

(58) Field of Classification Search
CPC ................................ B62B 3/001; B62B 3/008
USPC ............................................ 280/43.12, 43.13
See application file for complete search history.

(56) References Cited

U.S. PATENT DOCUMENTS

| 2,358,957 | A | | 9/1944 | Barrett |
| 2,417,394 | A | | 3/1947 | Framhein |
| 2,550,548 | A | | 4/1951 | Framhein |
| 2,598,151 | A | | 5/1952 | Warshaw |
| 4,615,533 | A | | 10/1986 | Sewell |
| 5,354,080 | A | * | 10/1994 | Jones ......................... 280/43.12 |
| 7,226,060 | B2 | | 6/2007 | Hartmann et al. |
| 7,296,806 | B2 | * | 11/2007 | Borrmann ................... 280/43.12 |
| 8,336,913 | B1 | | 12/2012 | Aaseby et al. |
| 8,376,089 | B2 | * | 2/2013 | Stone ........................... 187/232 |

FOREIGN PATENT DOCUMENTS

EP 1884439 B1 12/2011

* cited by examiner

Primary Examiner — Hau Phan
Assistant Examiner — Bryan Evans (57) ABSTRACT In one embodiment, a vehicle comprises a body, a steerable drive wheel attached to the body, and a load platform connected to the body that is movable between a lowered position and a lifted position. A load wheel is connected to the load platform and an intermediate load wheel is connected to the vehicle and positioned between the drive wheel and the load wheel. The load wheel is configured to facilitate moving the load platform between the lowered position and the lifted position and the intermediate load wheel is configured to cooperate with the load wheel to facilitate moving the load platform between the lowered position and the lifted position. The intermediate load wheel is also configured to form a pivot about which the vehicle turns throughout a range of motion of the load platform between and including the lowered position and the lifted position.

14 Claims, 8 Drawing Sheets

SYSTEMS AND METHODS FOR STEERING VEHICLES

RELATED APPLICATIONS

This application claims priority to U.S. provisional application No. 61/612,519 under 35 U.S.C. §119(e), titled "Delivery Pallet Jack" and filed on Mar. 19, 2012; the entirety of which is incorporated herein by reference.

BACKGROUND

Figure 1:
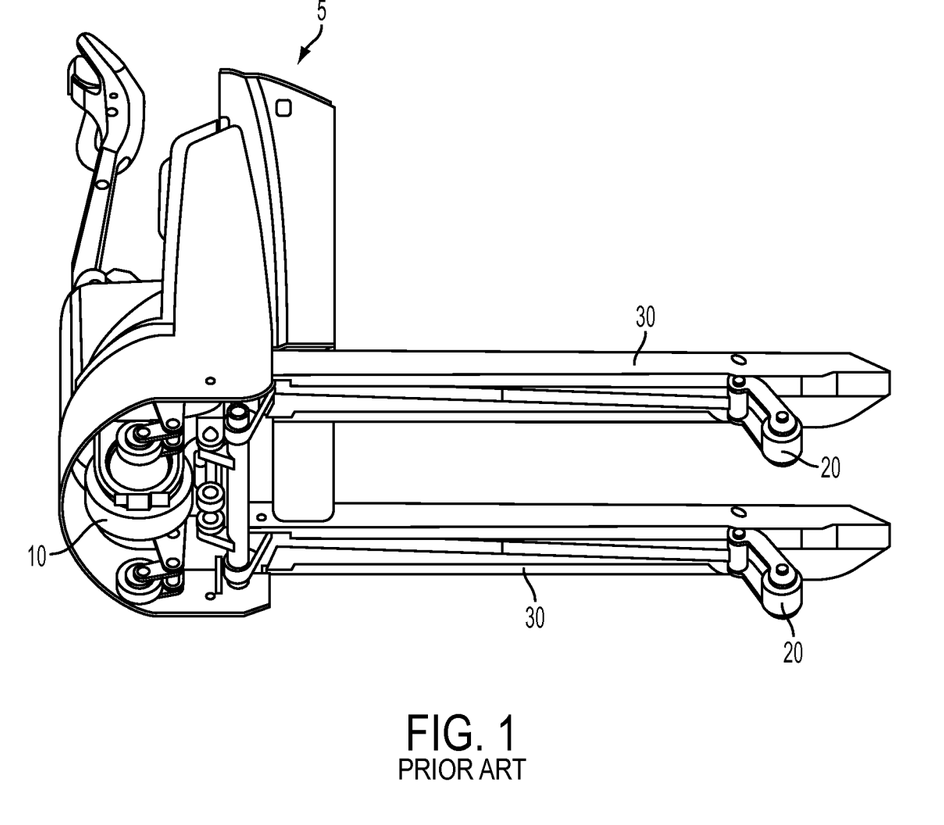
FIG. 1 illustrates a bottom orthogonal view of a prior art pallet truck.
Figure 2:
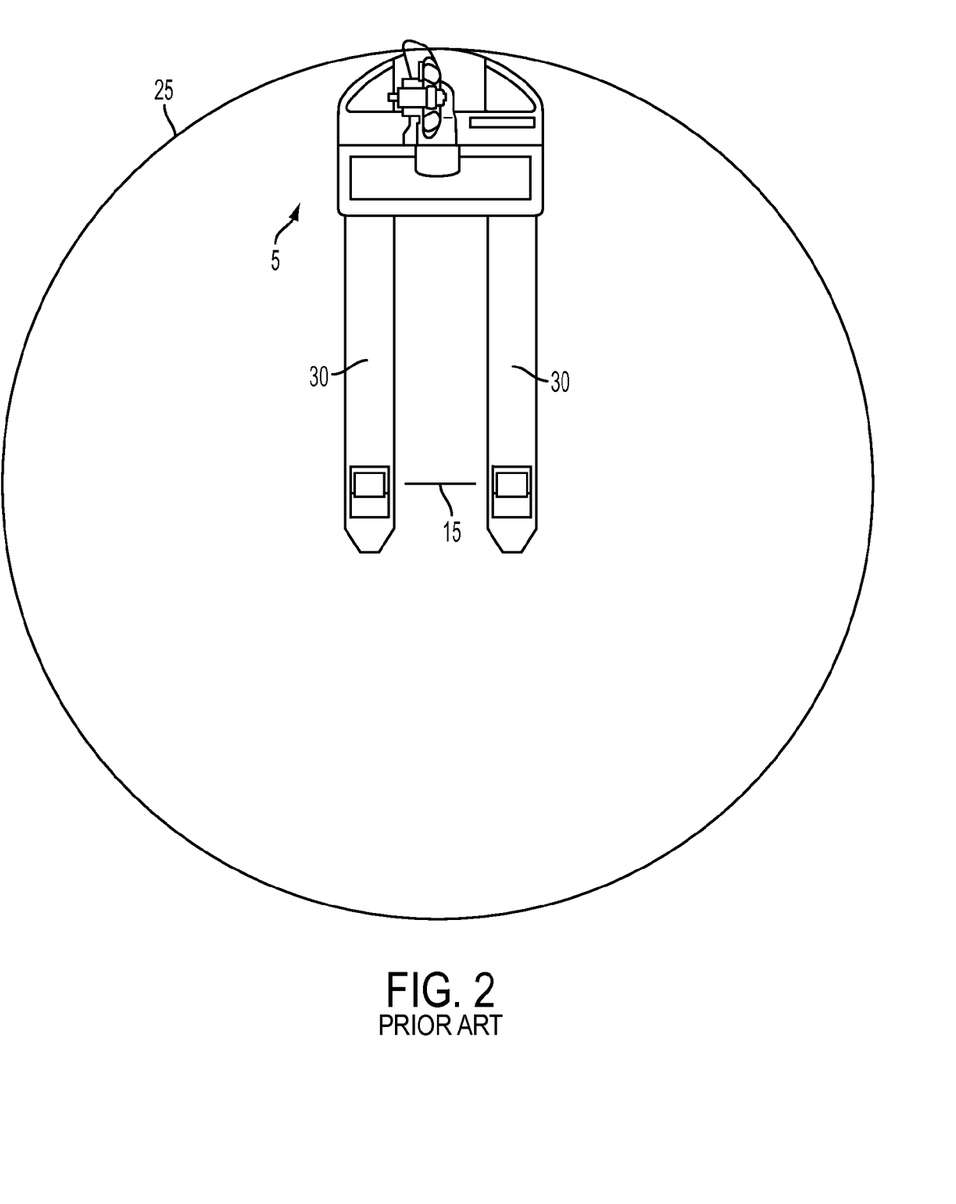
FIG. 2 illustrates a top view of the prior art pallet truck of FIG. 1.

Wheeled vehicles commonly rotate one or more steered wheels about a vertical axis to turn the vehicle in a turn circle. When a steered wheel is at its rotational limit, the vehicle turns in its smallest turn circle. Factors influencing the size of a vehicle's smallest turn circle are the length of the wheelbase, that is, how far the steered wheel is located from other wheels supporting the vehicle, and the extent of rotation of the steered wheel about the vertical axis. An exemplary vehicle, such as a pallet jack 5 (FIG. 1), may have a steered wheel 10 capable of rotating 90° from a straight position to cause the pallet jack 5 to turn about a pivot 15 created by and located between the rear wheels 20 during turning maneuvers. Rotating the steered wheel 10 by 90° can result in a smallest turn circle 25 for the pallet jack 5 having a diameter that is roughly twice the vehicle wheelbase (FIG. 2), that is, the distance between steered wheel 10 and the rear wheels 20.

Some devices attempt to decrease the size of the minimum turn circle of a vehicle, such as the pallet jack 5, by providing a structure located between steered wheels and rear wheels that contacts the ground when the forks 30 are at a lowered position. For example, see the devices described in U.S. Pat. Nos. 2,598,151; 4,615,533; 5,354,080; 7,226,060; and 8,336,913.

SUMMARY

In one embodiment, a vehicle comprises a body, a steerable drive wheel attached to the body, and a load platform connected to the body that is movable between a lowered position and a lifted position. A load wheel is connected to the load platform and an intermediate load wheel is connected to the vehicle and positioned between the drive wheel and the load wheel. The load wheel is configured to facilitate moving the load platform between the lowered position and the lifted position and the intermediate load wheel is configured to cooperate with the load wheel to facilitate moving the load platform between the lowered position and the lifted position. The intermediate load wheel is also configured to form a pivot about which the vehicle turns throughout a range of motion of the load platform between and including the lowered position and the lifted position.

DETAILED DESCRIPTION

The present inventor recognized that in cases of restricted clearance, such as inside a cargo truck, it may be desirable to have a more maneuverable vehicle capable of a smaller turn circle than typical vehicles have, and that it may be desirable to have a vehicle with such a smaller turn circle when a load platform is at its lowered position, its raised position, or anywhere in between. The present inventor also recognized that previous attempts to create a smaller turn circle for a vehicle have a common disadvantage of being restricted to having such a smaller turn circle when a load platform, such as a pair of forks, is at a lowered position.

The following description provides details for certain embodiments, but is not meant to be limiting in scope. The invention is described by the claims that follow the detailed description.

Figure 3:
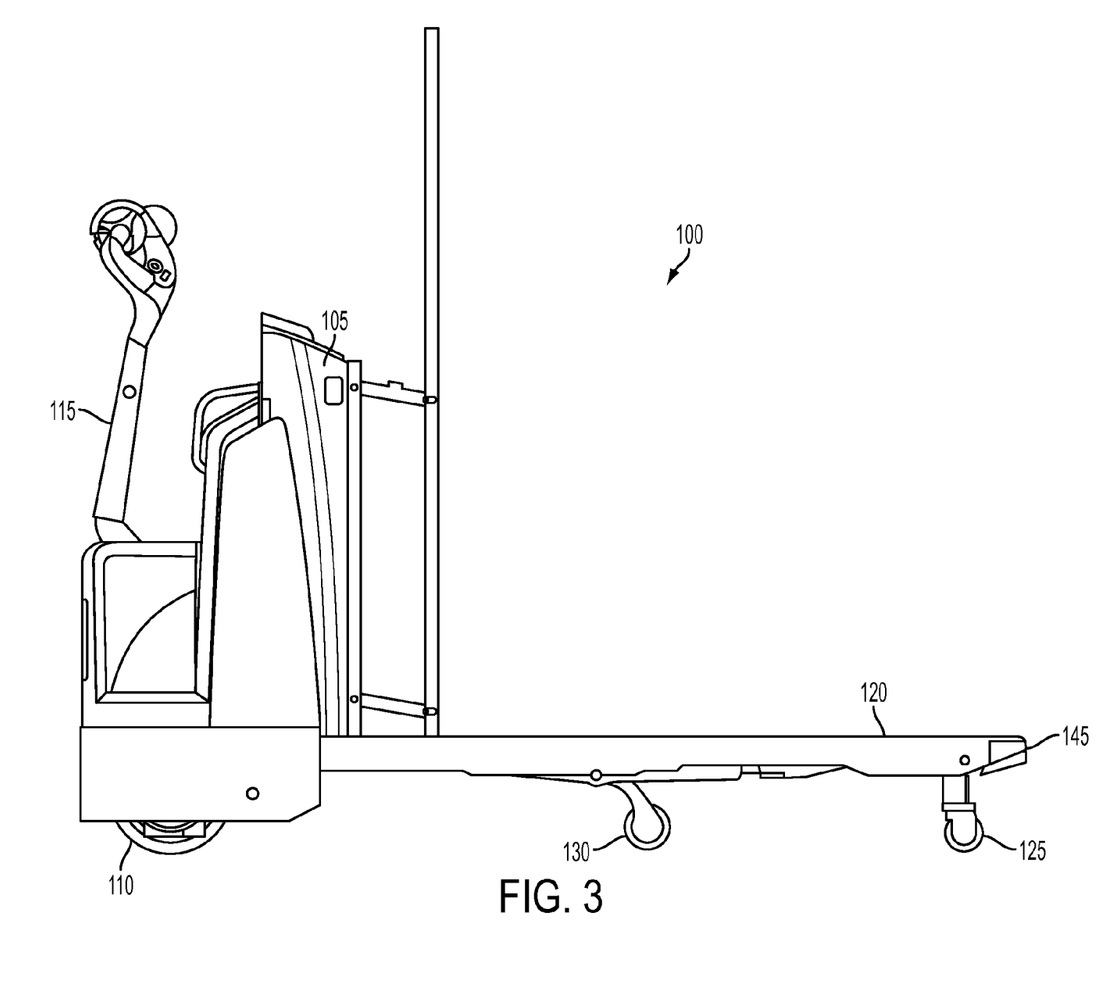
FIG. 3 illustrates a right-side view of a pallet truck equipped with a first embodiment of a steering system.

A vehicle, such as pallet truck 100, includes a supporting structure, such as body 105, with a drive wheel 110 attached thereto. The drive wheel 110 is configured to steer pallet truck 100, for example, by linkage to tiller arm 115 via mechanical, hydraulic, electronic, or other suitable linking device, such that rotation of tiller arm 115 causes rotation of drive wheel 110. Drive wheel 110 is optionally operatively connected to a motor or other suitable motive device for moving the pallet truck 100, but the drive wheel 110 may be powered via force applied to the tiller arm 115.

Figure 4:
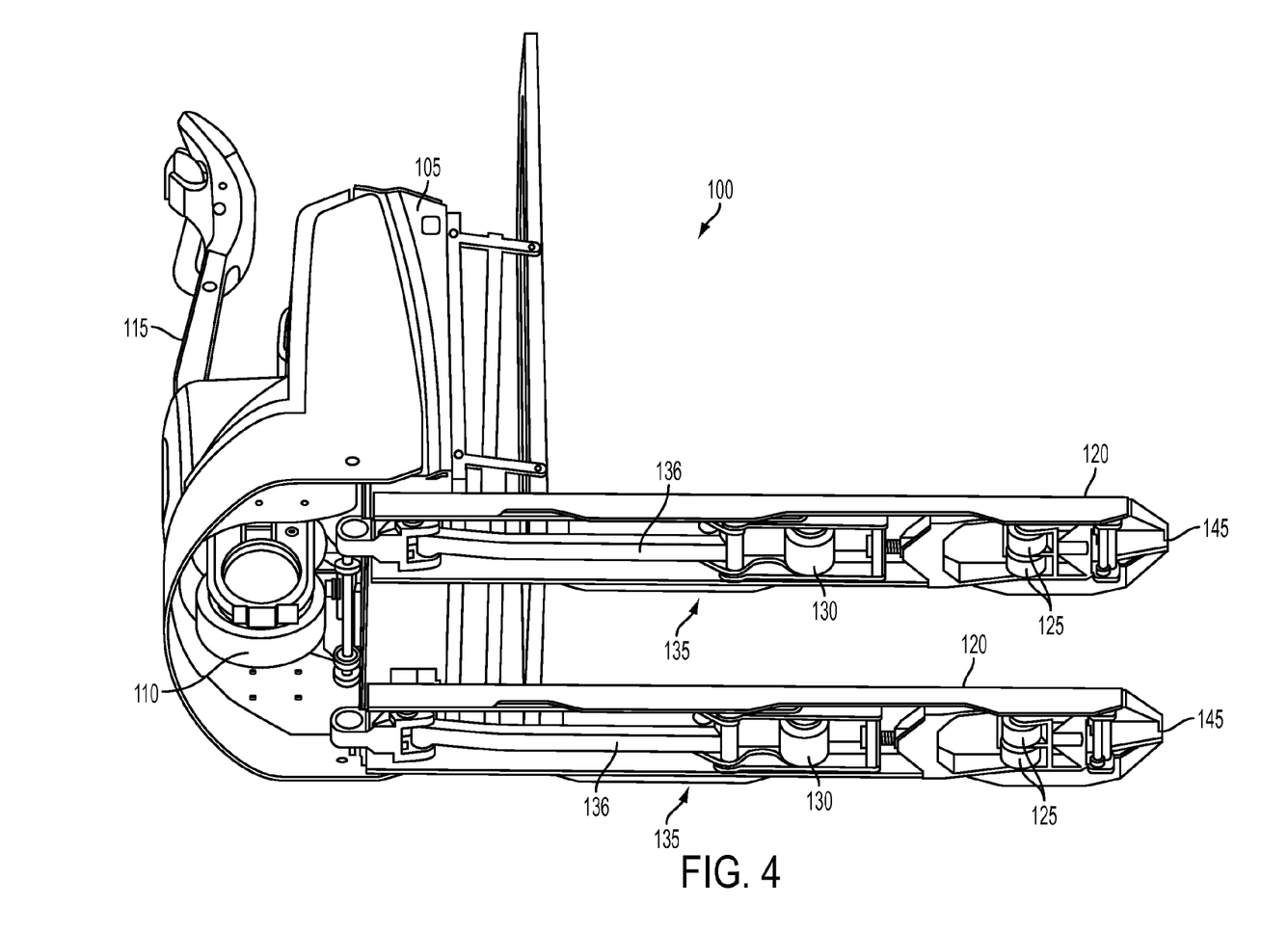
FIG. 4 illustrates a bottom orthogonal view of the pallet truck of FIG. 3 with the forks at a lowered position.
Figure 5:
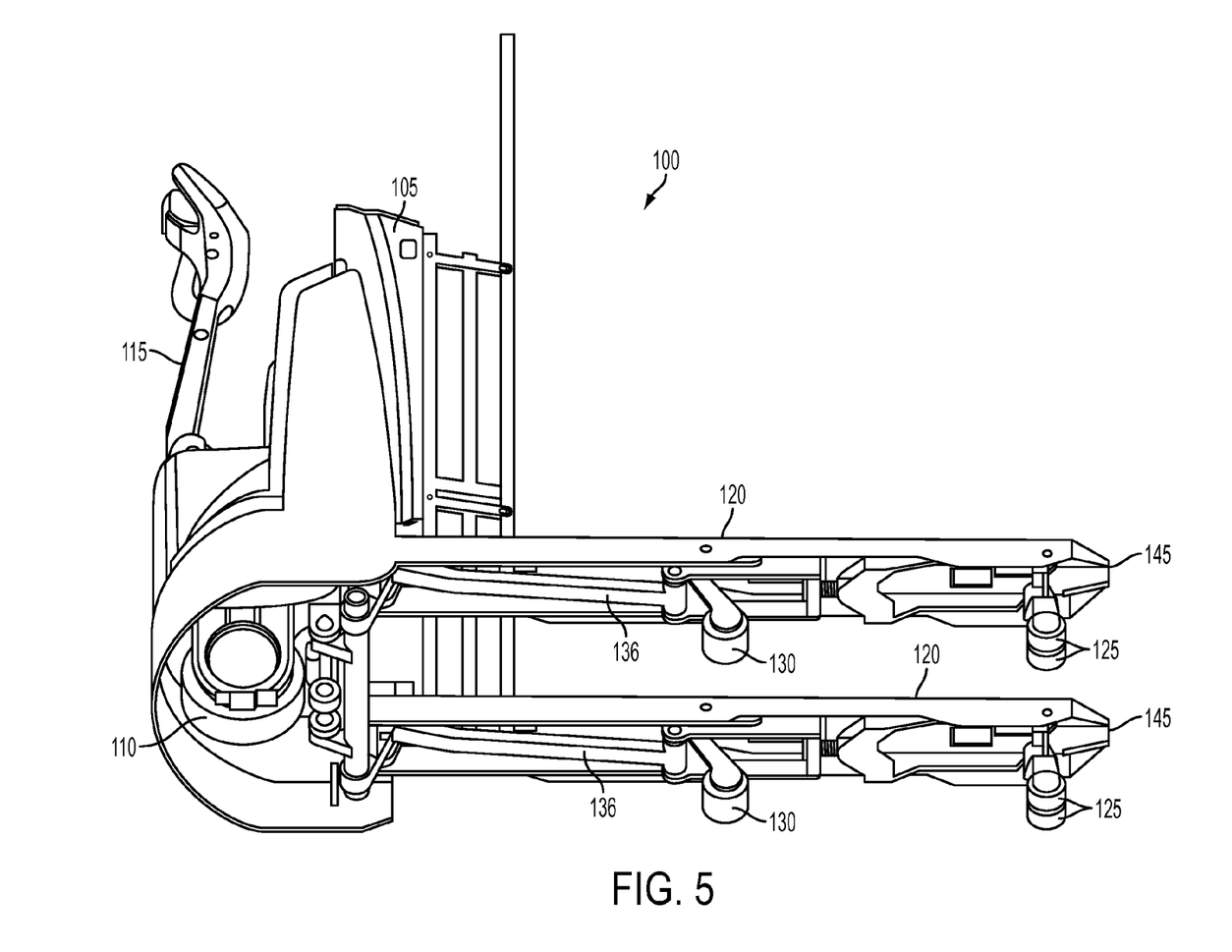
FIG. 5 illustrates a bottom orthogonal view of the pallet truck of FIG. 3 with the forks at a raised position.

Pallet truck 110 includes a load platform, such as forks 120, that is operatively connected to the body 105 for movement between a lowered position (FIG. 4) and a raised position (FIG. 5). The load platform lifts objects, for example, a pallet laden with goods, and may include one or more forks, a substantially flat surface, or other suitable structure for lifting objects. Rear load wheels 125 are connected to the forks 120, and are configured to facilitate moving the forks 120 between the lowered position, where the forks 120 are proximate to the ground, and the raised position, where the forks 120 are distal from the ground. Rear load wheels 125 bear at least some of the weight of pallet truck 110 and of any load carried by the forks 120.

At least one intermediate load wheel 130, or center load wheel in some embodiments, is included between the drive wheel 110 and the rear load wheels 125. Optionally, the intermediate load wheel 130 is located approximately halfway between the drive wheel 110 and the rear load wheels 125, but the intermediate load wheel 130 may be located anywhere between the drive wheel 110 and the rear load wheels 125. In the illustrated embodiment, two intermediate load wheels 130 are included and are attached to and underneath the forks 120. However, one intermediate load wheel may be attached to a vehicle support structure, to a load platform, such as between forks 120, or to any other suitable location of a vehicle.

The intermediate load wheels 130 and the rear load wheels 125 may be linked together so that they raise and lower in unison. Such linkage may occur via coordinated hydraulics, electronics, or mechanical apparatuses. In some examples, the intermediate load wheel 130 is not retracted within the fork 120 to the extent where the intermediate load wheel 130 loses contact with the ground while the rear load wheels 125 are retracted to a position where they lose contact with the ground when the forks 120 are at the lowered position. Optionally, the intermediate load wheel 130 is configured to continuously contact the surface of travel (ground). In some embodiments, the intermediate load wheel 130 supports a portion of the vehicle weight, a portion of the load on forks 120, or both, with the forks 120 at a lowered position, at a raised position, or at any position in between. Preferably, the intermediate load wheel 130 is provided with a raising and lowering mechanism, such as mechanical linkage 135, such that at least some, and preferably a majority, of the portion of the vehicle weight and load weight carried by the rear load wheels 125 and the intermediate load wheel 130 is borne by the intermediate load wheel 130.

In some embodiments, the intermediate load wheels 130 may be located at a position between the drive wheel 110 and the rear load wheels 125 such that a first portion of the total vehicle weight and load weight is carried by the rear load wheels 125 and the intermediate load wheels 130 and a second portion of such weight is carried by the drive wheel 110, wherein a majority of the first portion of such weight is borne by the intermediate load wheels 130. Preferably, intermediate load wheels 130 bear a majority of the first portion of such weight with the forks 120 at the raised position (FIG. 5), at the lowered position (FIG. 4), and at all positions in between. For example, for a combined vehicle weight and load weight of 4,000 kilograms (kg), 3,000 kg may be carried by the rear load wheels 125 and the intermediate load wheels 130 and 1,000 kg may be carried by the drive wheel 110. Preferably, of the 3,000 kg carried by the rear load wheels 125 and the intermediate load wheels 130, the intermediate load wheels may bear 1,501 kg or more. Or, 1,900 kg may be carried by the rear load wheels 125 and the intermediate load wheels 130 and 2,100 kg may be carried by the drive wheel 110. Preferably, of the 1,900 kg carried by the rear load wheels 125 and the intermediate load wheels 130, the intermediate load wheels may bear 951 kg or more. Other suitable load weight distributions may be used.

Figure 6:
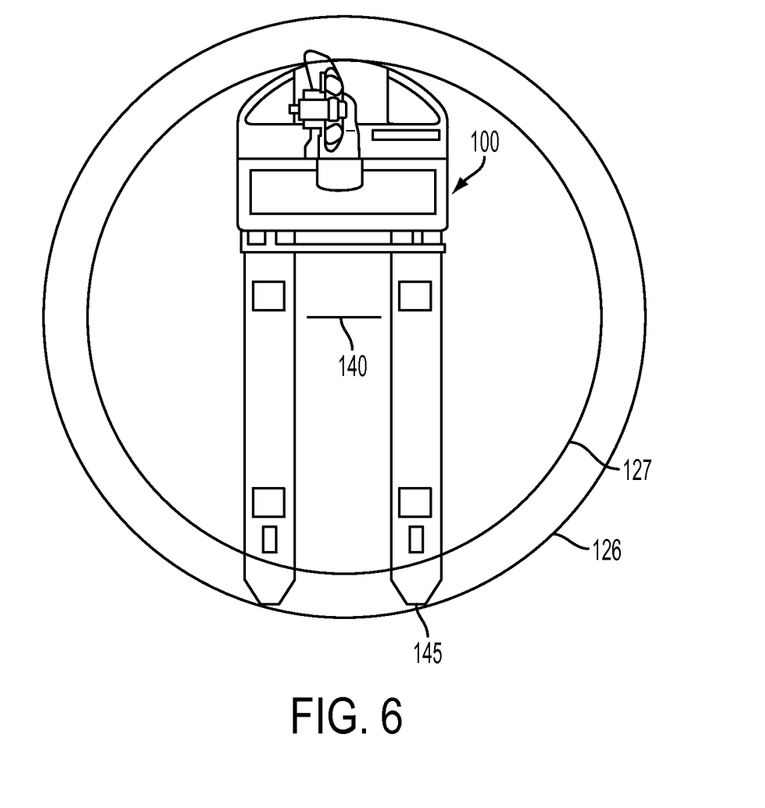
FIG. 6 illustrates a top view of the pallet truck of FIG. 3.

Optionally, the rear load wheels 125 are provided with a castering, or swiveling, capability to facilitate the vehicle turning about a pivot 140 (FIG. 6) defined by the intermediate load wheels 130. Preferably, the rear load wheels 125 and the drive wheel 110 follow turn circles, or circular paths 126, 127, respectively, about the pivot 140. The circular paths followed by the drive wheel 110 and the rear load wheels 125 may be the same circular path, or may be different circular paths as illustrated in FIG. 6. The arrangement of an intermediate load wheel 130 located between a drive wheel 110 and rear load wheels 125 facilitates reducing the vehicle turn circle, for example, by creating a shortened effective wheelbase, thereby increasing maneuverability, compared to a vehicle having only a drive wheel and rear wheels.

In some embodiments, the intermediate load wheels 130 are mounted to the forks 120 via mechanical linkage 135, which includes a crank arm assembly 136. A mechanism, such as a hydraulic system (not illustrated), is operatively connected to the mechanical linkage 135 to move the crank arm assembly 136 between two positions to cause the rear load wheels 125 and the intermediate load wheels 130 to move away from and towards the forks 120, which facilitates raising and lowering the forks 120, respectively. Preferably, the weight of pallet truck 100 and of any load borne on the fork 120 is distributed between the drive wheel 110, the intermediate load wheels 130 and the rear load wheels 125 throughout the range of motion of the forks 120. Intermediate load wheels 130 define the pivot 140 which includes a vertical axis about which the pallet truck 100 may rotate, in other words, a turning point for maneuvering when the forks 120 are in the raised or lowered positions, or anywhere in between.

In some embodiments, the rear load wheels 125 are configured with an optional caster function, that is, each of the rear load wheels 125 may swivel to facilitate moving the rear end 145 of pallet truck 100 through its turn circle 126 (FIG. 6). With the intermediate load wheels 130 contacting the ground, for example, when the forks 120 are raised (intermediate load wheels 130 and rear load wheels 125 lowered, or distal from the forks 120), lowered (intermediate load wheels 130 and rear load wheels 125 raised, or proximate to the forks 120), or anywhere in between, each rear load wheel 125 is able to rotate about a local vertical axis, making each of them essentially a caster wheel, and able to track about the pivot 140, which may be defined by intermediate load wheels 130, or may coincide with an intermediate load wheel, such as an intermediate load wheel that is positioned midway between rear load wheels, but longitudinally offset from such rear load wheels.

Figure 7:
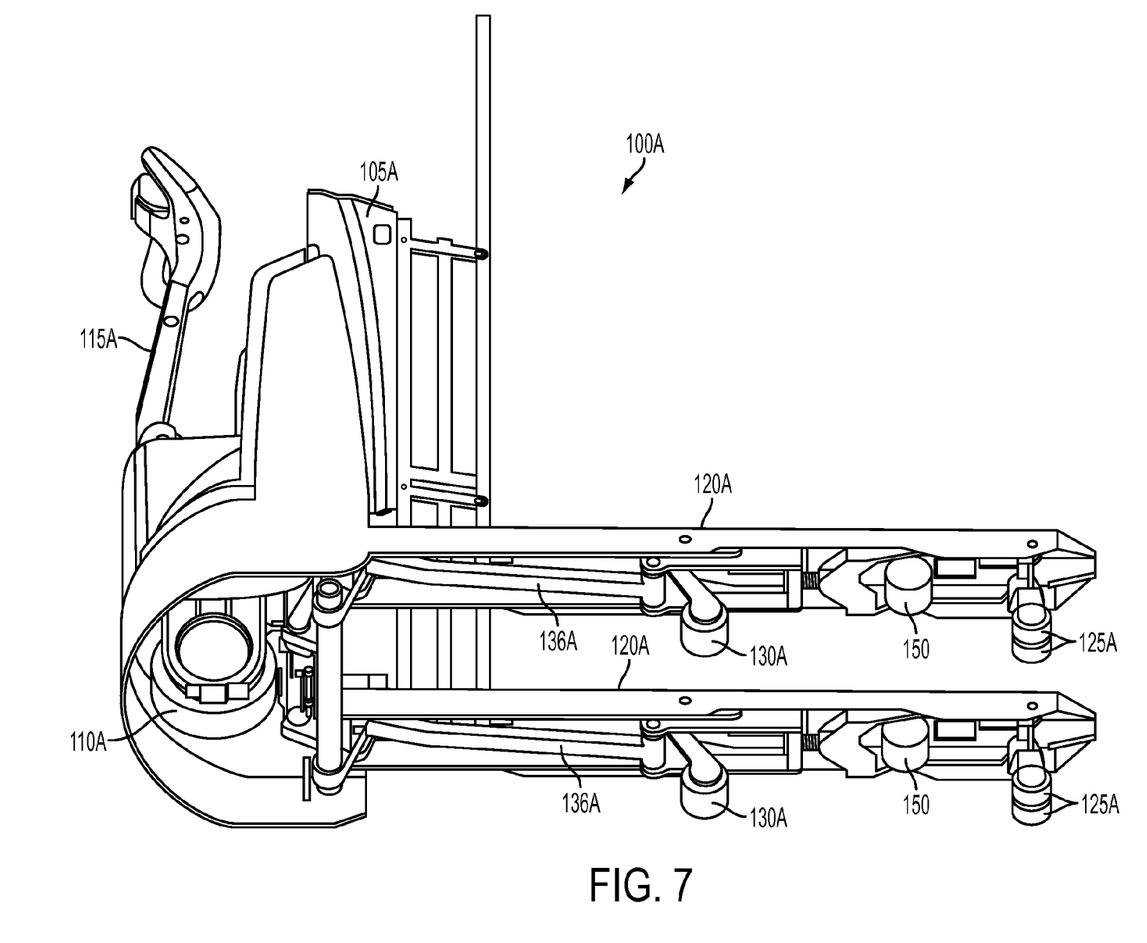
FIG. 7 illustrates a bottom orthogonal view of a pallet truck equipped with another embodiment of a steering system.

Optionally, a positioning caster 150 is located slightly ahead of the each rear load wheel 125A (FIG. 7). The positioning caster 150 may be held in a fixed position with respect to the fork 120A so that the positioning caster 150 moves up and down with the fork 120A. The positioning caster 150 may carry a portion of the load when forks 120A are in the lowered position to assist with maneuverability, for example, when rear load wheels 125A are not configured to swivel, or have a limited swiveling ability, or are not configured to bear load weight when the forks 120A are lowered.

When a positioning caster 150 is included, an optional alignment feature may be provided on the underside of each fork 120A to cause the rear load wheels 125A to move into a pre-defined positional relationship with respect to the forks 120a. A caster-alignment feature may engage the rear load wheel 125A when the forks 120A are lowered such that a longitudinal, or rolling, axis of the rear load wheel 125A is substantially perpendicular to the longitudinal direction of forks 120A and may be substantially parallel to the top surface of forks 120A. For example, the rear load wheels 125A may swivel or rotate to the proper storage orientation as a result of engaging a caster-alignment feature formed from a portion of the forks 120A, such as fork cavity 155 as the mechanical linkage 135A retracts the rear load wheels 125A into the forks 120A. In some embodiments, the rear load wheels 125A may not support any weight when the forks 120A are at their lowered position.

Optionally, a vehicle control system, such as a vehicle management system or an electronic controller (not illustrated) may receive input from one or more sensors that provide information relating to the vertical position of the tiller arm 115, the horizontal position of the tiller arm 115, the weight of a load on a load platform, or other suitable variable, singularly or in any combination. Based on the inputs, the vehicle control system may limit a maximum speed of the drive wheel 110, for example, when tight maneuvers (turns) are executed, when maneuvers with a heavy load are executed, or under other suitable circumstances. In one example, when the tiller arm 115 is at or near a vertical position, the maximum allowable vehicle speed may be reduced or limited to enhance control during maneuvers, which may include pivoting the vehicle about the pivot 140. When the tiller arm 115 is lowered, i.e., no longer at or near the vertical position, and the forks 120 are raised, a high travel speed may be enabled.

Figure 8:
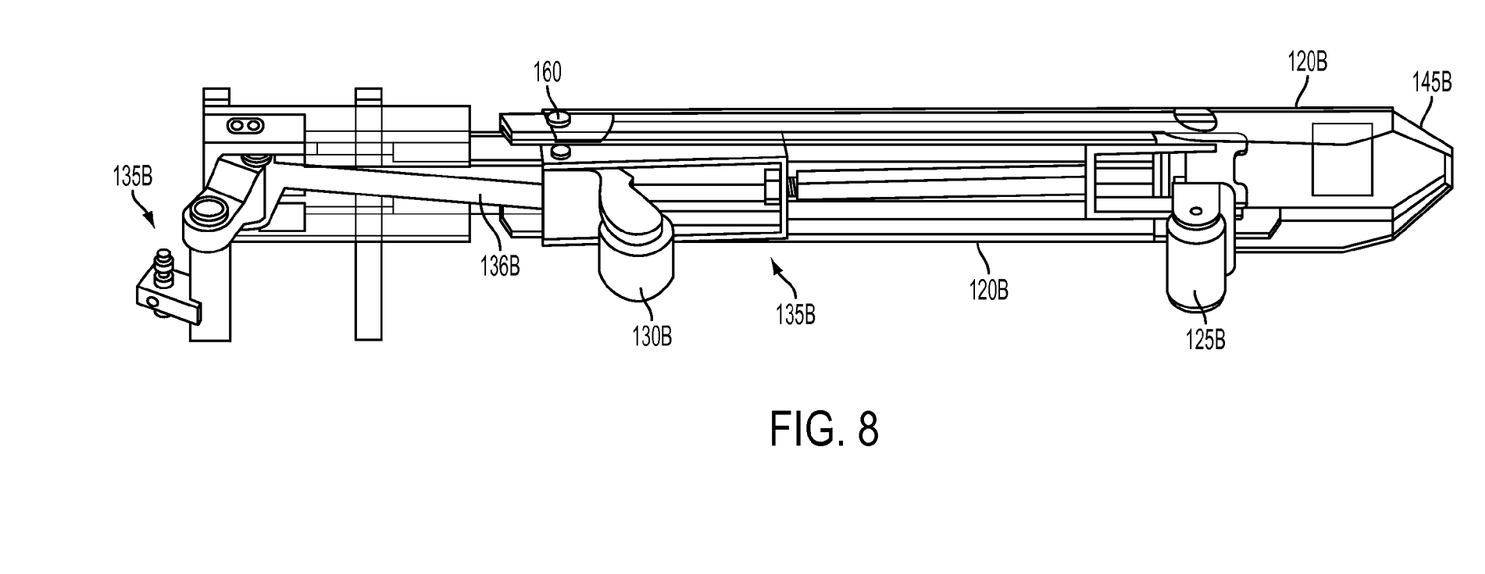
FIG. 8 illustrates a bottom orthogonal partial view of a pallet truck equipped with another embodiment of a steering system

Another optional feature that may be included is a hinged or articulating fork 120B (FIG. 8) that accommodates a threepoint load distribution between the drive wheel 110B, intermediate load wheel 130B, and rear load wheel 125B. Providing a pivot joint 160 interposed between portions of the forks 120B, or between the forks 120B and the body 105B, may facilitate having a relatively constant load at the drive wheel 110A to maintain drive traction, for example, when traversing uneven ground. Rotation of the forks 120B such that the ends 145B of the forks 120B move above and below the pivot joint 160 may permit the rear load wheels 125B to elevate slightly with respect to the intermediate load wheels 130B, so that the rear load wheels 125B may raise over bumps, such as the entry of a pallet, and may permit the rear load wheels 125B to descend slightly with respect to the intermediate load wheels 130B, so that the rear load wheels 120B may travel through divots, such as a pit in a floor, for operation without substantially tilting the pallet truck. In some embodiments, forks 120B may rotate about pivot joint 160 approximately plus 5° and minus 5° (up and down) to facilitate moving a loaded or unloaded pallet truck up and down a handicap ramp. Forks 120B, pivot joint 160, or both, optionally include one or more hard stops that limit rotation of forks 120B about pivot joint 160, for example, to hinder a pallet truck from tipping over.

It will be apparent to those skilled in the art that various modifications and variations can be made to the systems and methods of the disclosure. Other embodiments of the methods and systems will be apparent to those skilled in the art from consideration of the specification and practice of the methods and systems disclosed herein. It is intended that the specification and examples be considered as exemplary only, with a true scope of the invention being indicated by the claims and their equivalents.

The invention claimed is:
1. A vehicle comprising:
a body;
a drive wheel attached to the body, wherein the drive wheel is configured to steer the vehicle;
a load platform connected to the body, wherein the load platform is configured to move between a fully lowered position and a fully lifted position;
a load wheel connected to the load platform, wherein the load wheel is configured to facilitate moving the load platform between the fully lowered position and the fully lifted position; and
an intermediate load wheel connected to the vehicle, wherein the intermediate load wheel is positioned between the drive wheel and the load wheel, the intermediate load wheel is configured to cooperate with the load wheel to facilitate moving the load platform between the fully lowered position and the fully lifted position, and the intermediate load wheel is configured to form a pivot about which the vehicle turns throughout a range of motion of the load platform between and including the fully lowered position and the fully lifted position.

2. A vehicle according to claim 1, wherein the load wheel is further configured to swivel throughout a range of motion of the load platform between and including the fully lowered position and the fully lifted position.

3. A vehicle according to claim 1, further comprising:
a swivel wheel located proximate to the load wheel, wherein the swivel wheel is configured to contact the ground when the load platform is at the fully lowered position; and
wherein the load wheel is further configured to disengage the ground when the load platform is at the fully lowered position.

4. A vehicle comprising:
a body;
a drive wheel attached to the body, wherein the drive wheel is configured to steer the vehicle;
a load platform connected to the body, wherein the load platform is configured to move between a lowered position and a lifted position;
a load wheel connected to the load platform, wherein the load wheel is configured to facilitate moving the load platform between the lowered position and the lifted position;
an intermediate load wheel connected to the vehicle, wherein the intermediate load wheel is positioned between the drive wheel and the load wheel, the intermediate load wheel is configured to cooperate with the load wheel to facilitate moving the load platform between the lowered position and the lifted position, and the intermediate load wheel is configured to form a pivot about which the vehicle turns throughout a range of motion of the load platform between and including the lowered position and the lifted position; and
a mechanical linkage connected to the load wheel and the intermediate load wheel, wherein the mechanical linkage is configured to cause the load wheel and the intermediate load wheel to simultaneously move towards and away from the load platform when the load platform is moved between the lowered position and the lifted position, respectively.

5. A vehicle according to claim 1, further comprising a motor operatively connected to the drive wheel and configured to apply motive power to the drive wheel to move the vehicle.

6. A vehicle according to claim 1, further comprising:
a pivot joint, wherein the pivot joint is configured to permit an end of the load platform that is distal from the body to move above and below the pivot joint; and
a mechanical stop associated with the pivot joint, wherein the mechanical stop is configured to limit a range of pivoting motion of the load platform.

7. A vehicle according to claim 6, wherein the pivot joint is interposed between portions of the load platform.

8. A vehicle comprising:
a body;
a drive wheel attached to the body, wherein the drive wheel is configured to steer the vehicle;
a load platform connected to the body, wherein the load platform is configured to move between a lowered position and a lifted position;
a load wheel connected to the load platform, wherein the load wheel is configured to facilitate moving the load platform between the lowered position and the lifted position;
an intermediate load wheel connected to the vehicle, wherein the intermediate load wheel is positioned between the drive wheel and the load wheel, the intermediate load wheel is configured to cooperate with the load wheel to facilitate moving the load platform between the lowered position and the lifted position, and the intermediate load wheel is configured to form a pivot about which the vehicle turns throughout a range of motion of the load platform between and including the lowered position and the lifted position; and
a first portion of a vehicle weight and a load weight is carried by the load wheel and the intermediate load wheel, a second portion of the vehicle weight and the load weight is carried by the drive wheel, and a majority of the first portion of the vehicle weight and the load weight is borne by the intermediate load wheel for an entire range of motion of the load platform.

9. A method of vehicle operation comprising:

in response to receiving a command to lower a load platform of a vehicle, lowering the load platform to a fully lowered position at least partially via a load wheel and an intermediate load wheel positioned between the load wheel and a drive wheel;

in response to receiving a steering command, turning the drive wheel and pivoting the vehicle about a pivot defined by the intermediate load wheel with the load platform at the fully lowered position;

in response to receiving a command to lift a load platform of the vehicle, lifting the load platform at least partially via the load wheel and the intermediate load wheel positioned between the load wheel and the drive wheel; and in response to receiving a steering command, turning the drive wheel and pivoting the vehicle about the pivot with the load platform at a lifted position.

10. A vehicle comprising:

a body;

a drive means for steering the vehicle connected to the body;

a load platform connected to the body, wherein the load platform is configured to move between a fully lowered position and a lifted position; and a load lifting means for moving the load platform between a lowered position and a lifted position, wherein the load lifting means includes turning means for providing a pivot about which the vehicle turns throughout a range of motion of the load platform between and including the fully lowered position and the lifted position.

11. A vehicle according to claim 1, wherein the intermediate load wheel is connected to the load platform.

12. A vehicle according to claim 3, further comprising an alignment feature connected to the load platform, wherein the alignment feature is configured to engage the load wheel as the load platform is lowered.

13. A vehicle according to claim 11, wherein the load platform comprises a pair of forks.

14. A vehicle comprising:

a body;

a drive wheel attached to the body, wherein the drive wheel is configured to steer the vehicle;

a load platform connected to the body, wherein the load platform is configured to move between a lowered position and a lifted position;

a load wheel connected to the load platform, wherein the load wheel is configured to facilitate moving the load platform between the lowered position and the lifted position; and an intermediate load wheel connected to the vehicle, wherein the intermediate load wheel is positioned between the drive wheel and the load wheel, the intermediate load wheel is configured to continuously contact the ground throughout a full range of motion of the load platform, and the intermediate load wheel is configured to form a pivot about which the vehicle turns throughout the full range of motion of the load platform.

* * * * *